(12) United States Patent
Aditham et al.

(10) Patent No.: US 9,483,437 B2
(45) Date of Patent: Nov. 1, 2016

(54) ADDRESSING MULTI-CORE ADVANCED MEMORY BUFFERS

(75) Inventors: Shiva Aditham, Portland, OR (US); Steven C. Yang, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 2517 days.

(21) Appl. No.: 11/864,781

(22) Filed: Sep. 28, 2007

(65) Prior Publication Data

US 2009/0089513 A1 Apr. 2, 2009

(51) Int. Cl.
*G06F 12/02* (2006.01)
*G06F 13/42* (2006.01)

(52) U.S. Cl.
CPC ....... *G06F 13/4243* (2013.01); *G06F 13/4256* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 2007/0111606 A1* | 5/2007 | Goodwin | 439/633 |
| 2008/0002447 A1* | 1/2008 | Gulachenski et al. | 365/51 |
| 2008/0030966 A1* | 2/2008 | Goodwin | 361/749 |

\* cited by examiner

*Primary Examiner* — Charles Rones
*Assistant Examiner* — Ryan Dare
(74) *Attorney, Agent, or Firm* — International IP Law Group, P.L.L.C

(57) ABSTRACT

In some embodiments a method of addressing advanced memory buffers identifies whether a dual inline memory module includes more than one advanced memory buffer. If the dual inline memory module includes more than one advanced memory buffer, then each of the advanced memory buffers of the dual inline memory module is addressed separately, and an address is computed for a next dual inline memory module. Other embodiments are described and claimed.

14 Claims, 4 Drawing Sheets

ADDRESSING MULTI-CORE ADVANCED MEMORY BUFFERS

TECHNICAL FIELD

The inventions generally relate to addressing multi-core Advanced Memory Buffers.

BACKGROUND

A computer system may include one or more central processing units (CPUs) or processor(s). The CPU(s) may be coupled to a chip set (for example, via a bus). The chipset may include a memory controller hub (MCH) including a memory controller coupled to a system memory. The system memory stores data and responds to the memory controller through a sequence of instructions that are executed by the CPU(s) or processing device(s) included in the computing system. The MCH may also include, for example, a display controller coupled to a display. The chipset further may include an input/output control hub (ICH) coupled, for example, to the MCH via a hub interface. The ICH may be coupled, for example, to one or more input/output (I/O) devices. The ICH may also be coupled to a peripheral bus (for example, a Peripheral Component Interconnect or PCI bus). A PCI bridge may be coupled to the PCI bus to provide a data path between the CPU(s) and peripheral devices.

The system memory controlled by the memory controller may be a dynamic memory (for example, a Dynamic Random Access Memory or DRAM), a memory module, a dual in-line memory module (DIMM), a fully buffered dual in-line memory module (FB-DIMM), a Double Date Rate 2 (DDR2) memory, and/or a Double Data Rate 3 (DDR3) memory, for example. A Fully Buffered Dual Inline Memory Module (FB-DIMM) includes an onboard Advanced Memory Buffer (AMB) to support a serialized memory subsystem architecture. FB-DIMMs may be used, for example, to reduce the collective DRAM capacitive loading effects and to increase system memory by allowing more DIMMs (using more memory sockets) in a system. FB-DIMMs do not typically increase the speed of the memory subsystem, but they do increase the memory density (and capacity). The Advanced Memory Buffer (AMB) is often an integrated circuit (or chip) that is the memory module's interface between the memory controller (for example, of the motherboard and/or of the MCH) and all the other FB-DIMM modules on the motherboard. An AMB is a component within the memory that allows buffering of memory traffic to support large memory capacities. The AMB interface handles FB-DIMM channel and memory requests to and from the local DIMM, and forwards requests to other DIMMs on the FB-DIMM channel. At higher speeds, serial channel input/output (I/O) drivers require high power for driving the bit lanes across the memory DIMM, socket, and part of the next DIMM. Therefore, a lower power and/or higher capacity solution would be advantageous.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to addressing multi-core Advanced Memory Buffers.

In some embodiments a method of addressing advanced memory buffers identifies whether a dual inline memory module includes more than one advanced memory buffer. If the dual inline memory module includes more than one advanced memory buffer, then each of the advanced memory buffers of the dual inline memory module is addressed separately, and an address is computed for a next dual inline memory module.

In some embodiments programmable logic addresses a dual inline memory module, and firmware identifies whether the dual inline memory module includes more than one advanced memory buffer. If the dual inline memory module includes more than one advanced memory buffer, the firmware programs the programmable logic to address separately each of the advanced memory buffers of the dual inline memory module, computes an address for a next dual inline memory module, and programs the programmable logic with the address for the next dual inline memory module.

In some embodiments Advanced Memory Buffer (AMB) variations allow a reduction of power (and/or thermal) requirements for a Fully Buffered Dual Inline Memory Module (FB-DIMM). IN some embodiments multiple AMB cores are integrated into one chip. In some embodiments fast high speed channel lanes between AMBs are integrated within one core, and therefore do not need as much energy for signal transmission between the AMBs. This results in a reduced power consumption, leading to lower core temperatures and lower cooling requirements. In some embodiments the memory capacity of a system may be increased by using different DIMM form factors without increasing the number of slots and/or power.

Figure 1:
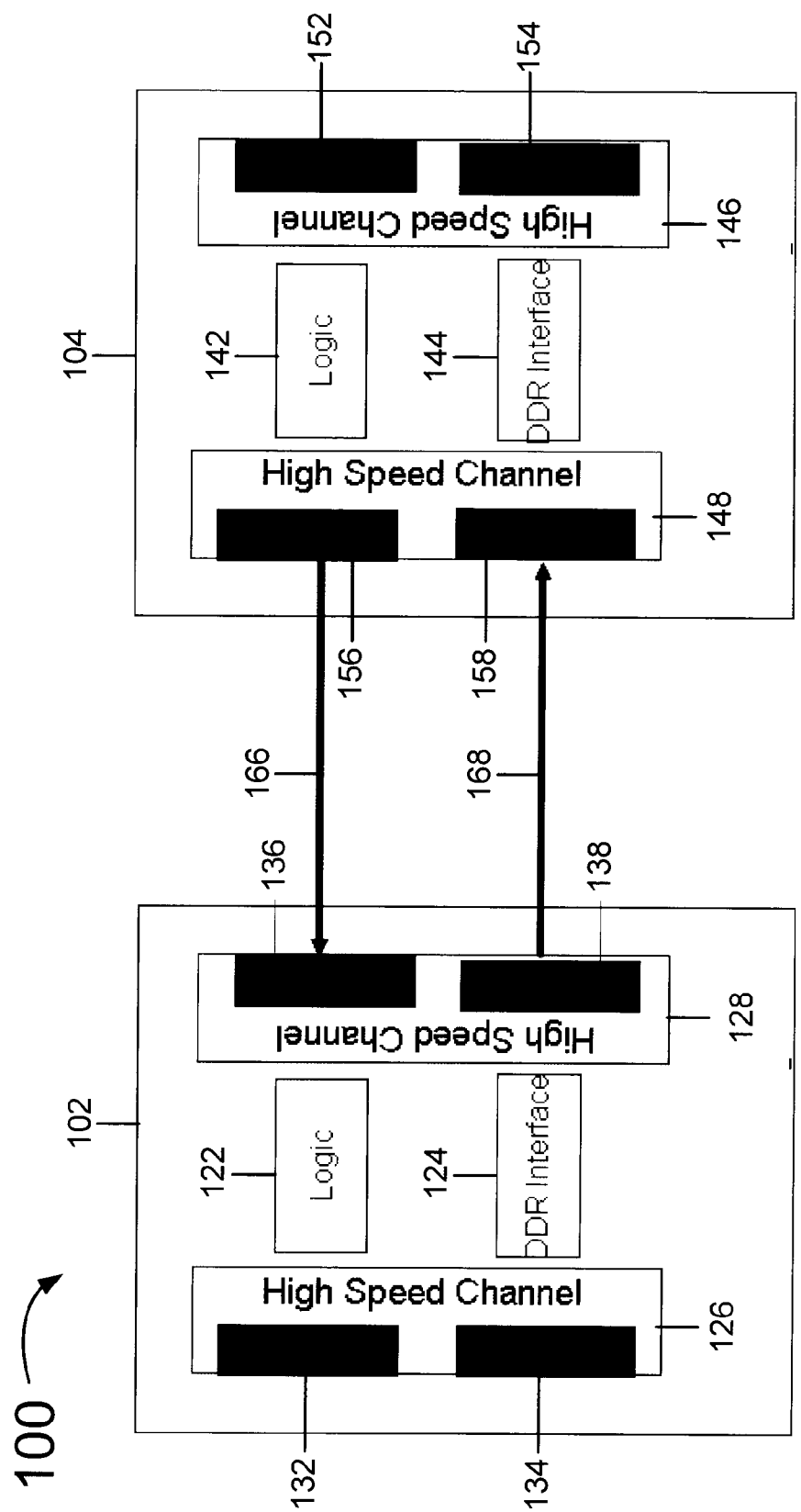
FIG. 1 illustrates a system according to some embodiments of the inventions.

FIG. 1 illustrates a system 100 according to some embodiments. In some embodiments system 100 includes an Advanced Memory Buffer (AMB) 102 and an Advanced Memory Buffer (AMB) 104. AMB 102 includes logic 122, a memory interface 124 (for example, a double data rate interface or DDR interface), and two high speed channels 126 and 128 for communication with other AMBs. High speed channel 126 includes a north bound channel 132 and a south bound channel 134. High speed channel 128 includes a north bound channel 136 and a south bound channel 138. AMB 104 includes logic 142, a memory interface 144 (for example, a double data rate interface or DDR interface), and two high speed channels 146 and 148 for communication with other AMBs. High speed channel 146 includes a north bound channel 152 and a south bound channel 154. High speed channel 148 includes a north bound channel 156 and a south bound channel 158. Two transmission channels 166 and 168 transmit information between the AMB 102 and the AMB 104. Transmission channel 166 transmits information from north bound channel 156 to north bound channel 136. Similarly, transmission channel 168 transmits information from south bound channel 138 to south bound channel 158.

In some embodiments AMB 102 and AMB 104 are integrated into their own separate integrated circuit chips.

Figure 2:
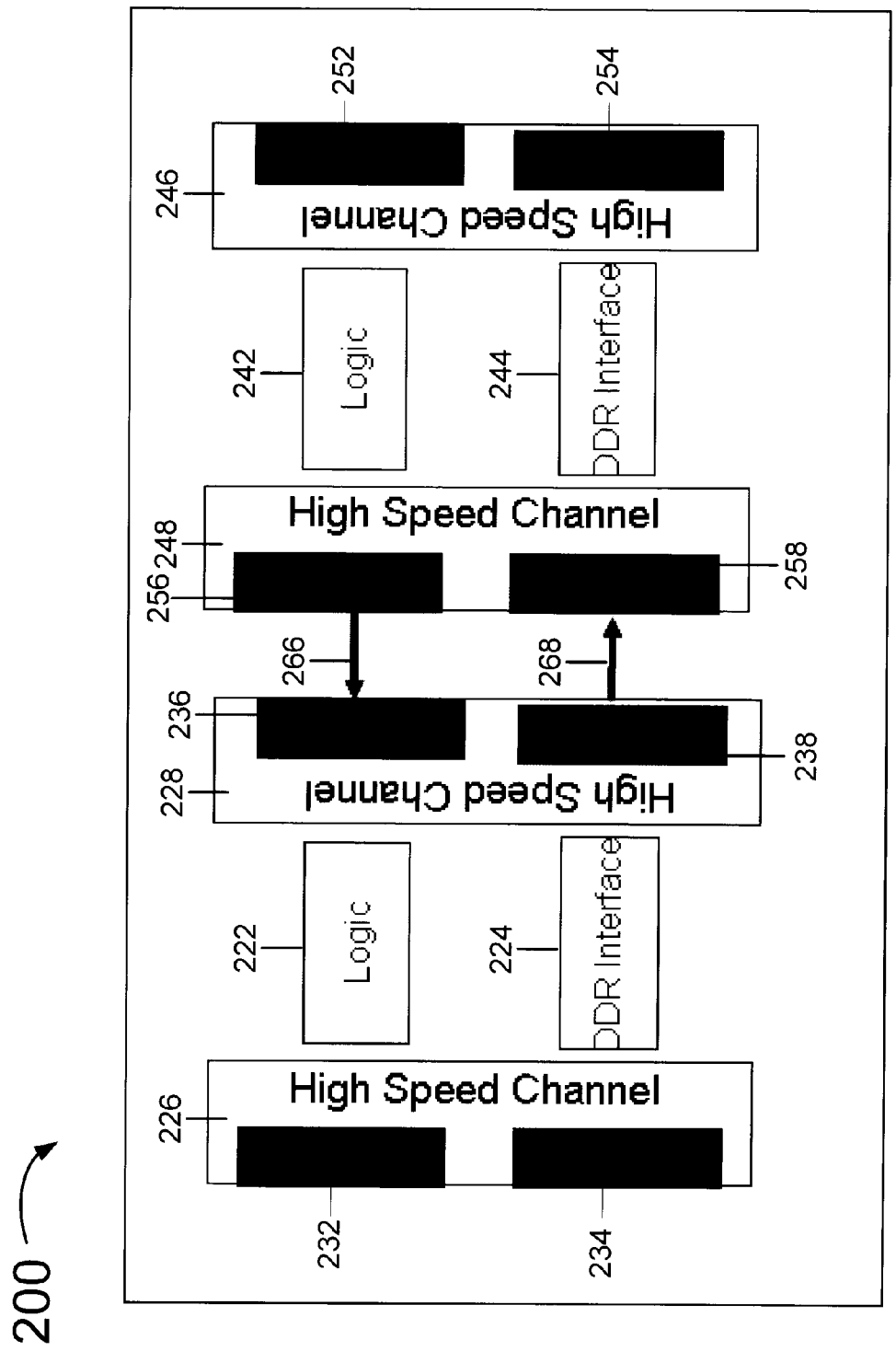
FIG. 2 illustrates a system according to some embodiments of the inventions.

FIG. 2 illustrates a system 200 according to some embodiments. In some embodiments system 200 is integrated into a single integrated circuit (or chip). In some embodiments, system 200 includes two AMBs that are integrated into the same integrated circuit (or chip). A first AMB includes logic 222, a memory interface 224 (for example, a double data rate interface or DDR interface), and two high speed channels 226 and 228 for communication with other AMBs. High speed channel 226 includes a north bound channel 232 and a south bound channel 234. High speed channel 228 includes a north bound channel 236 and a south bound channel 238. A second AMB includes logic 242, a memory interface 244 (for example, a double data rate interface or DDR interface), and two high speed channels 246 and 248 for communication with other AMBs. High speed channel 246 includes a north bound channel 252 and a south bound channel 254. High speed channel 248 includes a north bound channel 256 and a south bound channel 258. Two transmission channels 266 and 268 transmit information between the first AMB and the second AMB. Transmission channel 266 transmits information from north bound channel 256 to north bound channel 236. Similarly, transmission channel 268 transmits information from south bound channel 238 to south bound channel 258.

In some embodiments the first AMB and the second AMB of FIG. 2 are integrated into a single chip, thereby reducing power requirements and also resulting in better performance (for example, better throughput, power, etc.) In some embodiments the first and second AMB of FIG. 2 enable a reduction of power (and/or thermal) requirements for a Fully Buffered DIMM (FB-DIMM), for example by integrating multiple AMB cores into one chip. In some embodiments since the fast channel lanes between AMBs are confined within a single core they do not need as much energy for transmission between AMBs. Additionally, in some embodiments the memory capacity in a system is increased using different DIMM form factors without increasing the number of slots and/or power in the system. In some embodiments power and/or thermal requirements of a FB-DIMM are decreased, resulting in improved functionality, improved performance, improved power performance, and/or improved thermal performance. In some embodiments high speed channel lanes between AMBs are confined within a core, which reduces the amount of consumed energy. Lower power consumption leads to lower core temperatures and cooling requirements. In some embodiments high speed channel lanes between AMBs may be eliminated, resulting in improved performance. That is, in some embodiments although a first channel for serializing data is needed between, for example, a memory controller and the memory modules, other serial interfaces between DIMMs and/or between AMBs may be eliminated according to some embodiments. For example, a single command processing unit in one or more S-DIMMs can drive multiple memory interfaces (for example, multiple DRAM interfaces). In some embodiments commands are forwarded, some channels necessary for propagating commands and/or data remain, and other channels may be eliminated.

In some embodiments FIG. 2 illustrates two AMBs that are integrated within a single integrated circuit (or chip). However, in other embodiments more than two AMBs may be integrated within a single integrated circuit in a similar manner, by including the high speed channel lanes between AMBs within the same chip.

The FB-DIMM specification currently defines and allows only one AMB per DIMM (and/or per slot), and addresses them as such with support assumed, for example, from the motherboard layout. FB-DIMMs with one AMB per DIMM are referred to herein as R-DIMMs. FB-DIMMs with more than one AMB per DIMM are referred to herein as S-DIMMs. The inventors have recognized that new opportunities exist to increase the memory density by putting multiple FB-DIMMs (R-DIMMs) on a single card, or through use of multi-core DIMMs (S-DIMMs) as described above in reference to FIG. 1 and FIG. 2.

S-DIMMs and R-DIMMs add possibilities of at least three different configurations to be supported by a system. These three configurations include a system with only S-DIMMs, a system with only R-DIMMs, and a system with both S-DIMMs and R-DIMMs in any order. These three configurations can be supported according to some embodiments.

Figure 3:
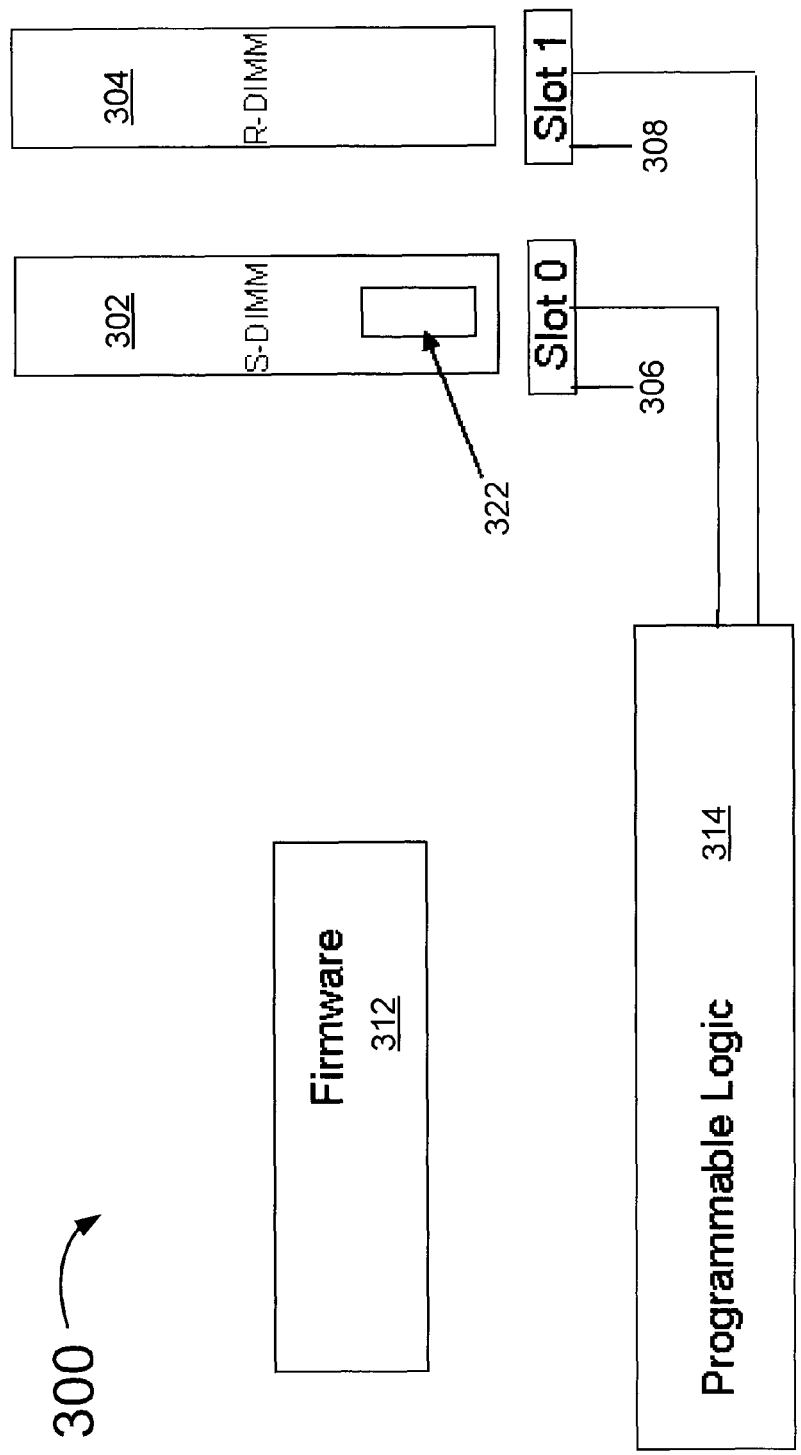
FIG. 3 illustrates a system according to some embodiments of the inventions.

FIG. 3 illustrates a system 300 according to some embodiments. System 300 includes an S-DIMM 302, an R-DIMM 304, a first slot (slot 0) 306, a second slot (slot 1) 308, firmware 312, and programmable logic 314. S-DIMM 302 further includes programmable logic 322.

In some embodiments firmware 312 includes, for example, standard Basic Input/Output System or BIOS, Extensible Firmware Interface or EFI, memory enumerating and configuring software, and/or Memory Configuration Code (MCC). Firmware 312 initializes the S-DIMM 302 and/or the R-DIMM 304 by going through, for example, an out of band mechanism (for example, via an SMBus operation). In some embodiments programmable logic 314 may be, for example, implemented within a memory controller hub and/or using SMBus. Programmable logic 314 may be, for example, programmable logic on a motherboard and/or implemented in hardware. Programmable logic 314 generates the appropriate address for each DIMM that is either on an S-DIMM or in an individual slot. Firmware 312 starts the enumeration (for example, as per the current FB-DIMM specification from JEDEC—at address 0xb0). If a non-AMB component is identified then the firmware programs the component as necessary and the procedure moves to address the next slot at 0xb2 (as the FB-DIMM specification requires). This process continues until a valid AMB based DIMM is identified. If the DIMM is an R-DIMM such as R-DIMM 304, then the R-DIMM is initialized normally as per the FB-DIMM specification. If the DIMM is an S-DIMM such as S-DIMM 302, then the number of AMBs and/or cores are determined, and the programmable logic on the DIMM (for example programmable logic 122) is programmed accordingly to address each one of the AMBs (for example, as per the FB-DIMM specification drive SA[2:0] pins). The firmware 312 then computes the address of the next DIMM slot according to how many AMBs were resident within the S-DIMM, for example. In some embodiments programmable logic such as programmable logic 314 (for example, programmable hardware on the motherboard) is then programmed to drive the pins going to that slot with the right data. The process is continued until all the slots are addressed correctly and every AMB is driven to the correct address. In this manner, S-DIMMs and R-DIMMs are able to coexist in the same system and function without requiring changes to the FB-DIMM specification.

Figure 4:
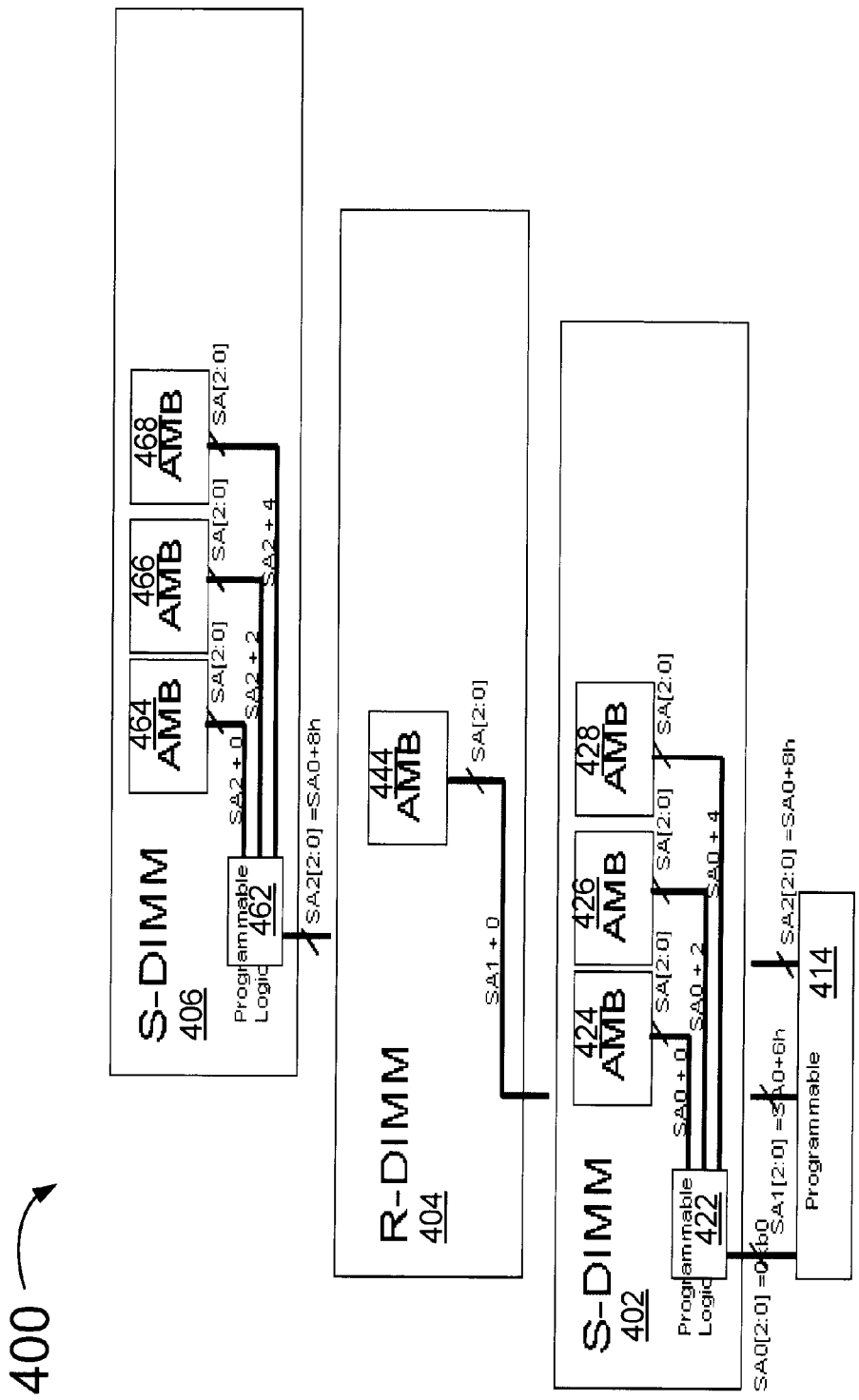
FIG. 4 illustrates a system according to some embodiments of the inventions.

FIG. 4 illustrates a system 400 according to some embodiments. System 400 includes an S-DIMM 402, an R-DIMM 404, an S-DIMM 406, and programmable logic 414. S-DIMM 402 includes programmable logic 422 and three AMBs 424, 426, and 428. Although S-DIMM 402 includes three AMBs it is noted that S-DIMM 402 may include any number of AMBs. R-DIMM 404 includes an AMB 444. S-DIMM 406 includes programmable logic 462 and three AMBs 464, 466, and 468. Although S-DIMM 402 includes three AMBs it is noted that S-DIMM 402 may include any number of AMBs.

In some embodiments, as firmware (not illustrated in FIG. 4) starts the enumeration S-DIMM 402 is recognized at, for example, address 0xb0. It is recognized by the firmware that S-DIMM includes three AMBs and the programmable logic 422 in S-DIMM 402 is programmed accordingly to address SA[2:0] pins for each AMB. The firmware then computes the address of the next DIMM (R-DIMM 404) as being at SA1 (=SA0+6). The firmware also then programs the programmable logic 414 to drive the SA pins going to the slots for the next DIMM (R-DIMM 404) with the correct address data. The firmware then identifies that the next DIMM (R-DIMM 404) is an R-DIMM and initializes it as usual (for example, as per the FB-DIMM specification). Then the firmware recognizes S-DIMM 406 at the next address SA2 [2:0] (=SA0+8). It is recognized by the firmware that S-DIMM 406 includes three AMBs and the programmable logic 462 in S-DIMM 402 is programmed accordingly to address SA[2:0] pins for each AMB.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
   programmable logic to address a dual inline memory module; and
   firmware to identify whether the dual inline memory module includes more than one advanced memory buffer, and if the dual inline memory module includes more than one advanced memory buffer, the firmware to program the programmable logic to address separately each of the advanced memory buffers of the dual inline memory module, and to compute an address for a next dual inline memory module and to program the programmable logic with the address for the next dual inline memory module.

2. The apparatus of claim 1, the firmware further to identify whether the dual inline memory module includes one advanced memory buffer, and if the dual inline memory module includes one advanced memory buffer, the firmware to program the programmable logic to address the advanced memory buffer as a typical fully buffered dual inline memory module.

3. The apparatus of claim 1, the programmable logic further to use the computed address for a second dual inline memory module, and the firmware further to identify whether the second dual inline memory module includes more than one advanced memory buffer, and if the second dual inline memory module includes more than one advanced memory buffer, then the firmware further to program the programmable logic to address separately each of the advanced memory buffers of the second dual inline memory module, and to compute an address for a next dual inline memory module and to program the programmable logic with the address for the next dual inline memory module.

4. The apparatus of claim 1, the programmable logic further to identify for each dual inline memory module in a system whether that dual inline memory module includes more than one advanced memory buffer, and if that dual inline memory module includes more than one advanced memory buffer, the firmware to program the programmable logic to address separately each of the advanced memory buffers of that dual inline memory module, and to compute an address for a next dual inline memory module and to program the programmable logic with the address for the next dual inline memory module.

5. The apparatus of claim 1, the firmware to program programmable logic in the dual inline memory module to address separately each of the advanced memory buffers of the dual inline memory module.

6. The apparatus of claim 1, wherein the programmable logic is programmable logic on a motherboard and the firmware is firmware on a motherboard.

7. The apparatus of claim 1, wherein the programmable logic is included in a memory controller hub.

8. A system comprising:
a dual inline memory module including at least one advanced memory buffer;
programmable logic to address the dual inline memory module; and
firmware to identify whether the dual inline memory module includes more than one advanced memory buffer, and if the dual inline memory module includes more than one advanced memory buffer, the firmware to program the programmable logic to address separately each of the advanced memory buffers of the dual inline memory module, and to compute an address for a next dual inline memory module and to program the programmable logic with the address for the next dual inline memory module.

9. The system of claim 8, the firmware further to identify whether the dual inline memory module includes one advanced memory buffer, and if the dual inline memory module includes one advanced memory buffer, the firmware to program the programmable logic to address the advanced memory buffer as a typical fully buffered dual inline memory module.

10. The system of claim 8, further comprising a second dual inline memory module, the programmable logic further to use the computed address for the second dual inline memory module, and the firmware further to identify whether the second dual inline memory module includes more than one advanced memory buffer, and if the second dual inline memory module includes more than one advanced memory buffer, then the firmware further to program the programmable logic to address separately each of the advanced memory buffers of the second dual inline memory module, and to compute an address for a next dual inline memory module and to program the programmable logic with the address for the next dual inline memory module.

11. The system of claim 8, the programmable logic further to identify for each dual inline memory module in the system whether that dual inline memory module includes more than one advanced memory buffer, and if that dual inline memory module includes more than one advanced memory buffer, the firmware to program the programmable logic to address separately each of the advanced memory buffers of that dual inline memory module, and to compute an address for a next dual inline memory module and to program the programmable logic with the address for the next dual inline memory module.

12. The system of claim 8, the firmware to program programmable logic in the dual inline memory module to address separately each of the advanced memory buffers of the dual inline memory module.

13. The system of claim 8, wherein the programmable logic is programmable logic on a motherboard and the firmware is firmware on a motherboard.

14. The system of claim 8, wherein the programmable logic is included in a memory controller hub.

* * * * *